Feb. 28, 1961     E. H. HARTEL     2,972,898
ACTUATION MECHANISM

Filed May 26, 1959     5 Sheets-Sheet 1

INVENTOR.
ERWIN H. HARTEL
BY

ATTORNEY

Feb. 28, 1961 E. H. HARTEL 2,972,898
ACTUATION MECHANISM
Filed May 26, 1959 5 Sheets-Sheet 3

INVENTOR.
ERWIN H. HARTEL
BY
ATTORNEY

INVENTOR.
ERWIN H. HARTEL

Feb. 28, 1961   E. H. HARTEL   2,972,898
ACTUATION MECHANISM
Filed May 26, 1959   5 Sheets-Sheet 5

ROTATION IN % TOWARD DOWN POSITION
AVERAGE HINGE MOMENT vs POSITION

INVENTOR.
ERWIN H. HARTEL
BY
ATTORNEY

United States Patent Office 2,972,898
Patented Feb. 28, 1961

2,972,898

ACTUATION MECHANISM

Erwin H. Hartel, Cleveland, Ohio, assignor to Cleveland Pneumatic Industries, Inc., Cleveland, Ohio, a corporation of Ohio Filed May 26, 1959, Ser. No. 815,947

11 Claims. (Cl. 74—105)

This invention relates to actuation systems and more particularly to a new and improved actuation system which operates to move an aircraft flight surface between two positions and locks the surface in each operated position.

It is an important object of this invention to provide an actuation system operable between two positions and capable of locking in each of the operated positions.

It is another important object of this invention to provide an actuating linkage including a locking toggle which is moved between two locked positions.

It is still another object of this invention to provide an actuation system including a locking toggle having an element which is rotated through substantially 180° operated by a linear actuator connected to the toggle by a linkage that produces rotational torque through the full 180°.

It is still another object of this invention to provide a wing tip actuation system operable to rotate a wing tip structure between two operated positions and which locks the structure in each of the operated positions.

Further objects and advantages will appear from the following description and drawings, wherein.

In modern high speed aircraft, lateral stabilization is a problem when the aircraft is operated at supersonic speeds. If the stabilizers are designed to provide sufficient area for lateral stabilization when the aircraft is in high speed flight, they are considerably larger than is necessary during the subsonic flight. Also, if the lifting surfaces are designed to have sufficient area for the subsonic flight, they are much larger than is necessary in the high speed flight range. Therefore, it is desirable to arrange the aircraft structure so that a portion of the lifting surface can be operated between an extended position and a vertically extended or folded position. With such an arrangement, the flight surface is extended during the low speed flight when additional lifting area is required and is folded to a vertically extended position for operation as a stabilizer during the high speed flight operation. This makes it possible to reduce the overall drag of the aircraft and more efficiently utilize the flight surface.

An actuation system according to this invention is particularly suited for rotating a wing tip structure between an extended position and a folded position and for locking the wing tip structure in each of these positions. One of the requirements of such systems is to provide a locking structure capable of withstanding forces far in excess of the forces necessary for actuation. These excessive forces occur due to aircraft maneuvering or gust loads and the like. Therefore, one of the features of the structure incorporating this invention is that it provides positive locking which is capable of withstanding forces substantially in excess of the forces required to actuate the system.

Figure 1:
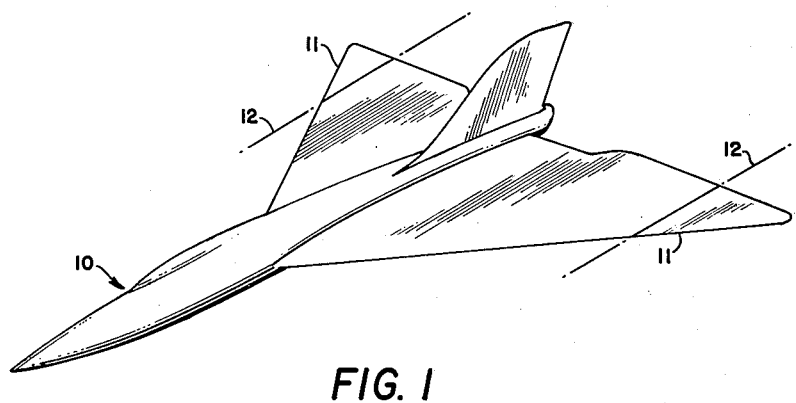
Figure 1 is a perspective view of a representative aircraft incorporating foldable wing tips illustrating the wing tip in the extended position.
Figure 2:
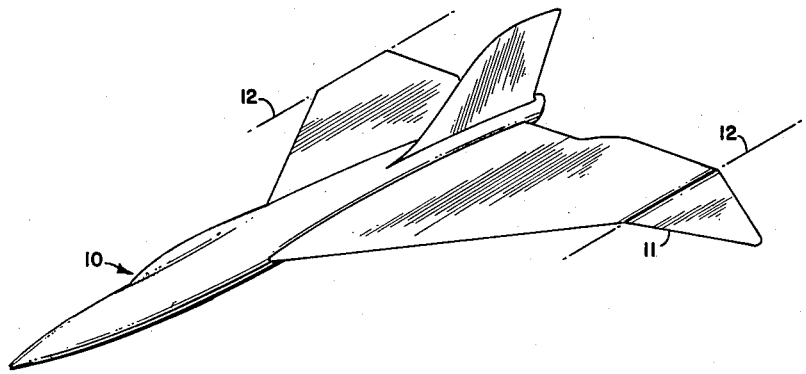
Figure 2 is a view similar to Figure 1 illustrating the aircraft with the wing tip in the folded position.

Referring to the drawings, Figure 1 illustrates a representative aircraft 10 to which this actuation system is particularly suited illustrating the aircraft 10 with its wing tips 11 in the extended position. This is the flight configuration for low speed flight particularly when the aircraft is landing and taking off. The actuation system is operable to move the wing tips 11 between the extended position and the folded or operated positions of Figure 2 while the aircraft is in flight and is capable of locking the wing tip in each position against the various flight strains which occur during flight operation.

To actuate the wing tip 11, a series of identical actuating units are mounted along the hinge axis 12. The actuation units are preferably placed along the hinge axis 12 so that they will equally share the load. All the units are preferably identical and interchangeable to minimize the service and maintenance requirement. Also, each unit is arranged so that it can be separately removed when malfunction of one of the units requires its replacement.

Referring to Figures 3 to 6, each of the actuation units includes two identical side frames 13 which are adapted to be fastened to the frame of the main wing panel. A hinge member 14 is journalled on the side frames 13 by a hinge pin 16 and is in turn bolted to the wing tip panel 11. Therefore, the actuating units themselves provide the hinge structure for connecting the wing tips 11 to the main wing frame. Mounted between the side frames of each unit are two identical actuators 17 and 18 which are each coupled through a drive linkage 15 and a toggle type linkage 19 and 21 respectively to the hinge member 14. The actuators 17 and 18 each include a cylinder 22 and a piston or output element 23 axially movable relative to the cylinder under the influence of hydraulic fluid under pressure. The cylinder 22 of each actuator 17 and 18 is mounted by trunnions 24 on the side frames 13 so that each actuator is free to rotate about the axis of the trunnions 24. The elements of the two linkages are interchangeable even though they are in opposite positions so only the structure of the lower linkage will be described in detail with the understanding that it applied equally in structure to the upper linkage.

Figure 9:
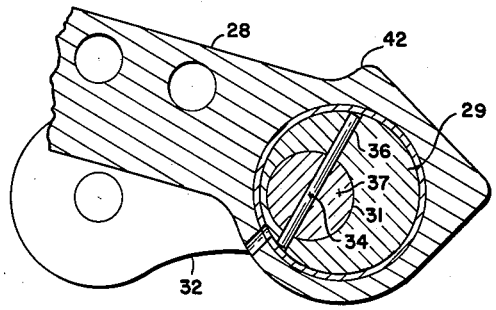
Figure 9 is an enlarged fragmentary section illustrating the structure of the eccentric bushing connecting the drive link to the locking crank arms.

The piston 23 of the lower actuator 17 is connected by a pivot pin 26 to a pair of idler crank arms 27 which are journalled on the side frames 13 for rotation about an axis 25. The pivot pin 26 also connects the rearward end of a drive link 28 to the end of the piston 23. The forward end of the drive link 28 is journalled on an eccentric bushing 29, shown in Figure 9, mounted on a forward pivot pin 31 for rotation about an eccentric axis 37. The outer ends of the forward pivot pin 31 extend through and are supported by locking crank arms 32 which are journalled on the side frames 13 for rotation about a crank axis 33. The connection between the crank arms 32 and forward pivot pin 31 prevents relative rotation therebetween and the eccentric bushing 29 is locked on the pivot pin by a locking pin 36. This insures that the axis 37 of the connection between the drive link 28 and the locking arms 32 will be stable in its orientation relative to the axis 34 of the pivot pin 31. The rearward end of a lock link 38 is journalled on the pivot pin 31 on either side of the drive link 28. The forward end of the lock link 38 is journalled on an adjusting pivot 39 on the hinge member 14 adjacent to the lower surface of the wing tip panel 11 so a maximum moment arm is provided to rotate the wing tip 11.

The upper actuator 18 is connected to the hinge member 14 by a similar linkage which is in a different position but includes interchangeable elements. The lower locking crank arm 32 and its associated locking link 38 co-operate to form the locking type toggle linkage 19. Similarly, the upper locking crank arm 32 and its associated locking link 38 co-operate to form the upper toggle linkage 21.

Figure 3:
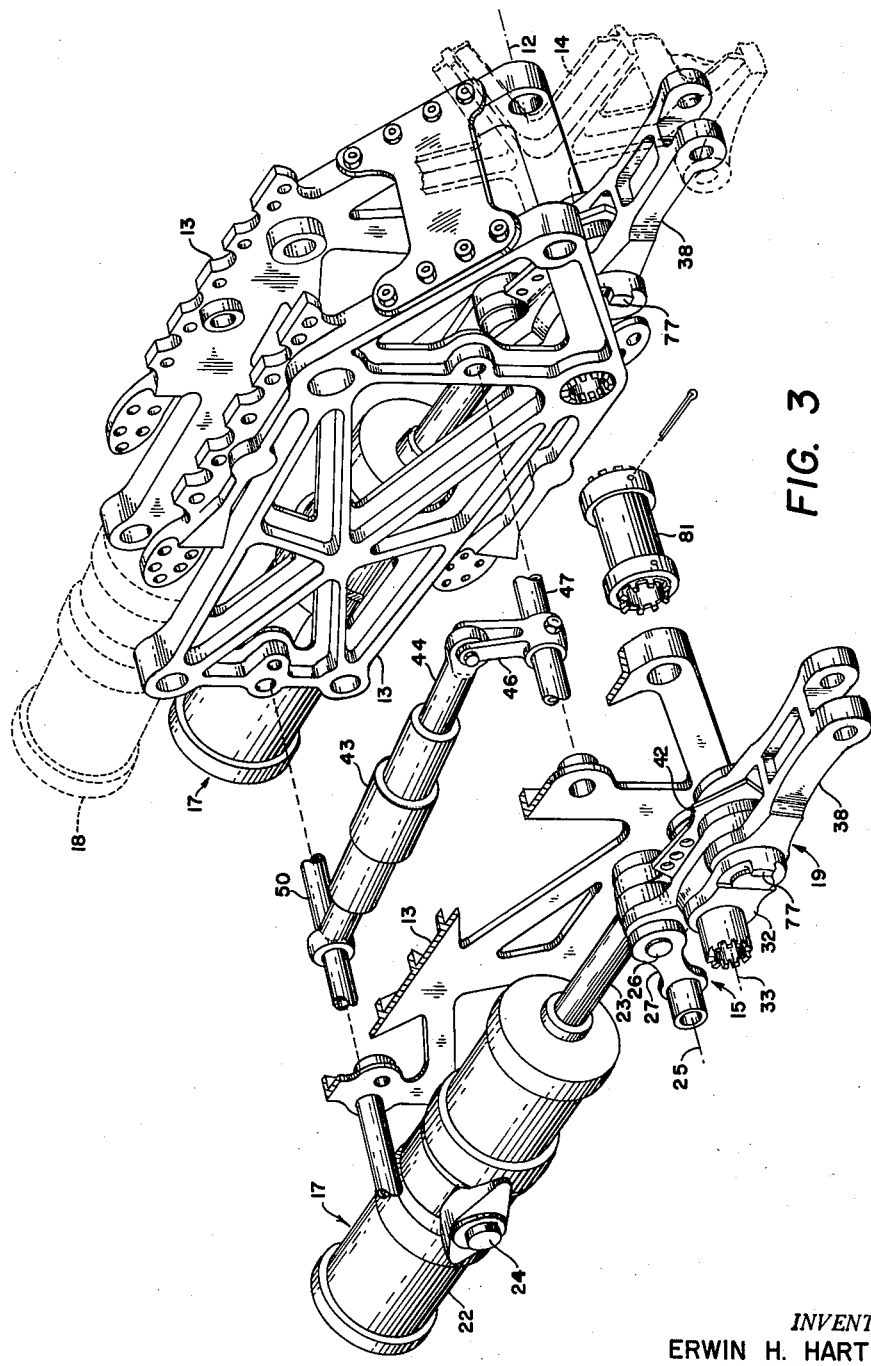
Figure 3 is a perspective view of the actuating units with parts removed for purposes of illustration.
Figure 4:
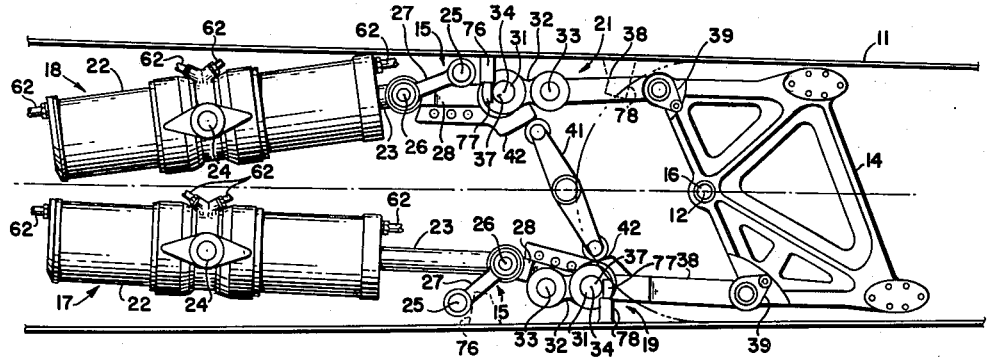
Figure 4 is a side elevation, with portions removed for purposes of illustration, of one actuating unit showing the positions the elements assume when the wing tip is in the extended position.
Figure 5:
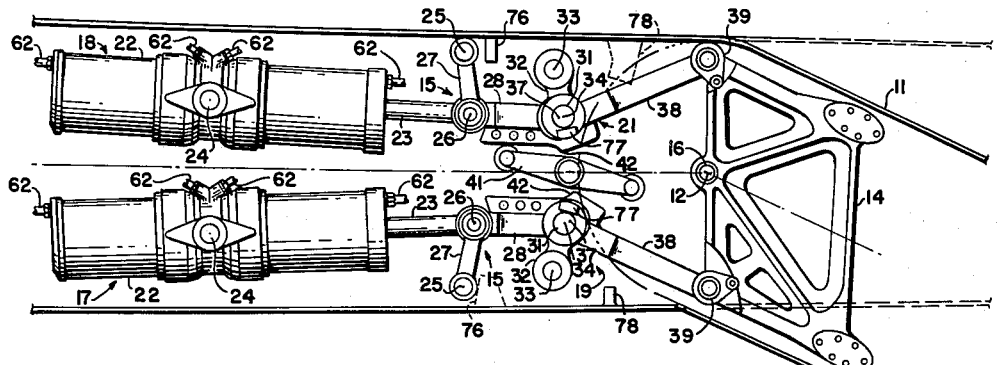
Figure 5 is a view similar to Figure 4 illustrating the positions of the elements in an intermediate operating position.

A locking lever 41 is journalled on the side frames 13 for rotation between a locked position shown in Figure 4 and an operated or unlocked position shown in Figure 5. When this lever is in the locked position, it engages a cam 42 formed on each of the drive links and mechanically maintains the two toggle linkages 19 and 21 in their overcenter locked position. The locking lever 41 is resiliently maintained in the locked position by a lock actuator and spring 43 shown in Figures 3 and 8 which normally maintains the locking lever in the locked position of Figure 4 and is operable to rotate the locking lever 41 to the released position of Figure 5. The lock actuator and spring 43 is provided with a piston 44 which connects to an arm 46 mounted on a shaft 47 which is journalled on the side frames 13. The locking lever 41 is supported by the shaft 47 so that rotation of the shaft by the lock actuator and spring 43 operates to rotate the locking lever 41 between its two positions. A shaft 50 extending between the frames 13 is used to support the rearward end of the lock actuator and spring 43.

Figure 7:
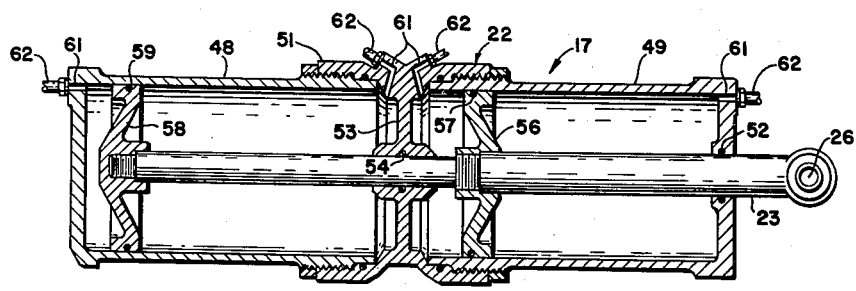
Figure 7 is a longitudinal section of one of the linear actuators used to operate the system illustrating the structural details thereof.

In Figure 7, the structure of the actuator 17 is illustrated. It should be understood that the actuator 18 is identical to the actuator 17 so that the following description applies to both. The actuator 17 is compounded so that it can be selectively operated by alternate hydraulic systems in the event of hydraulic failure of one of the hydraulic supply systems. The cylinder 22 of each actuator is formed of two cylindrical members 48 and 49 which are mounted at their adjacent open ends on a trunnioned body 51. The piston 23 extends through a gland 52 in the outer end of the forward cylindrical member 49 and through a bulkhead 53 integrally formed in the trunnioned body 51. A seal 54 mounted on the bulkhead 53 provides sealing engagement with the piston 23 and divides the unit into two separately functioning actuators in the same body. A forward piston head 56 is threaded onto the piston 23 on the forward side of the bulkhead 53. A seal 57 mounted on the periphery of the piston head 56 provides sealing engagement with the forward cylindrical member 49. A rearward piston head 58 is threaded onto the rearward end of the piston rod and is provided with a seal 59 which engages the rearward cylindrical member 48. Suitable ports 61 are provided at the ends of the cylindrical members 48 and 49 and in the trunnioned body 51 to provide separate hydraulic connections for both sides of each piston head. These ports open to the uppermost part of each of the actuating chambers so that air cannot be trapped within the system. External hydraulic lines 62 connect the ports of the actuator to the hydraulic supply lines for each unit. If the hydraulic lines connected to the two sides of the forward piston head 56 are controlled and pressurized, the forward piston head operates to produce the required force to operate the actuating system. When the forward portion of the actuator is operated, the lines 62 connected to the two sides of the rearward piston head 58 are both connected to the reservoir return so that a hydraulic lock will not be present. When the rearward actuator portion is used to power the system, the pressure is controlled to the two sides of the rearward piston head 58. In this operation, both sides of the forward piston head 56 are connected to the reservoir return. Suitable sources of pressure fluid and control valves (not shown) must be provided to supply pressure to control the operation of the actuators.

Figure 8:
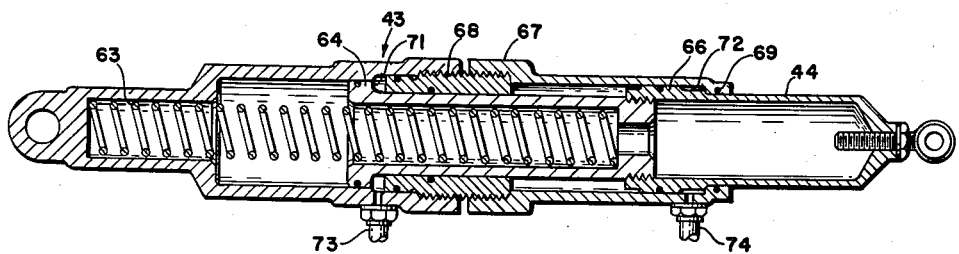
Figure 8 is a longitudinal section of the spring and lock actuator.

The locking actuator and spring unit 43, shown in Figure 8, is provided with a mechanical spring 63 which urges the piston 44 toward the extended position and a dual hydraulic actuation system is coupled to the main hydraulic system so that it can be operated by either of the operating hydraulic supply systems to overcome the spring and move the piston 44 to the compressed position. The piston 44 is therefore provided with two piston heads 64 and 66 which co-operate with the body 67 and glands 68 and 69 to define separate actuating chambers 71 and 72 respectively. When hydraulic fluid under pressure is admitted to either of the chambers 71 or 72 through inlet ports 73 or 74, the piston 44 moves to the left against the action of the spring to a compressed position at which time the locking lever 41 is rotated to its operated or unlocked position.

The two actuators 17 and 18 and their associated linkages are shown in Figure 4 in the position they assume when the wing tip 11 is in the extended position. At this time, the crank axis 33 of the upper lock crank arms 32 on the side frames 13 is below a line connecting the axis 34 of the pivot pin 31 and the axis of the adjusting pivot 39. Therefore, the upper toggle linkage 21 is in an overcenter and locked substantially in its compressed dead center position and any force in either compression or tension applied to the lock link 38 by the hinge member 14 is transmitted through the lock crank arms 32 directly to their pivot connection on the side frames. Therefore, the high locking stresses are not transmitted to the drive link 28 and actuator 18. A stop 76 on the side frames is engaged by a co-operating projection 17 formed on the locking crank arm 32 to prevent movement of the toggle linkage beyond the locked position shown. The locking lever 41 also engages the cam 42 on the drive link 28 so the locking toggle 21 is prevented from moving in either direction from the overcenter locked position.

The elements are proportioned so that the axis of the upper piston 23 passes below the axis 25 of the pivot of the idler crank arm 27 on the side frame when the elements are in the locked position. Therefore, an extending force on the upper piston rod produces a counterclockwise rotational force on the idler arms 27. The same force also places the drive link 28 in compression producing a force along the axis of the link acting at the pivot axis 37 of the drive link 28 on the locking crank arms 32. Because the drive link is journalled on an eccentric bushing, the line of action of the compressive force on the drive link passes below the axis 33 of the connection between the locking crank arms 32 on the side frames 13. The compression force on the drive link 28 therefore produces a counterclockwise force moment on the locking crank arms 32 which rotates these arms in a counterclockwise direction to unlock the toggle 21 after the locking lever 41 is moved out of engagement with the cam surface 42. The compressive force on the drive link is also transmitted to the locking link 38 and operates to rotate the hinge member 14 about the hinge axis 12.

In order to provide adjustment of the linkage, the adjusting pivot 39 is mounted on the hinge member 14 with an eccentric. Adjustment of this pivot insures that the toggle linkage will assume the overcenter position against its stop 76 when the wing tip 11 is in the extended position.

The toggle linkage 19 connecting the lower actuator is proportioned so that the lower locking link 38 and the associated locking crank arms 32 are in the extended overcenter locked position substantially at its extended dead center position when the wing tip 11 is extended. A forward stop 78 on the side frames is provided which engages the projection 77 on the locking crank arms 32 when the axis 34 of the pivot pin 31 is below a line connecting the crank axis 33 and the axis of the adjusting pivot 39. Therefore, the lower linkage is also in the overcenter locked condition when it engages its stop. Here again, the locking arm 41 engages the cam 42 on the drive link 28 to maintain the linkage against its stop. The line of action of the lower drive link 28 passes above the crank axis 33 so a force on the lower piston 23 urging it to the left operates to produce a counterclockwise rotational moment on the locking crank arms 32 which moves the lower toggle linkage 19 away from its overcenter locked position after the locking lever 41 is rotated to disengage the cam 42. The two overcenter toggle linkages 19 and 21 both lock to position the wing tip panel and operate to produce a maximum degree of rigidity because their action lines are adjacent to the upper and lower wing surfaces.

When the wing tip 11 is to be rotated from the extended position to the folded position, the upper actuator 18 is pressurized to produce an extending force on the upper piston 23 and the lower actuator 17 is pressurized to produce a retracting force on the lower piston 23. At the same time, the locking lever 41 is rotated in a counterclockwise direction by the lock actuator 43. The force on the upper actuator produces an extending force on the upper toggle linkage 21 and the force on the lower actuator produces a tension force on the lower toggle linkage 19. The two pivots 39 connecting the lock link 38 to the hinge member 14 are symmetrically located on opposite sides of the hinge axis 12 so that a force moment is developed on the hinge member 14 which rotates it in a clockwise direction to lower the wing tip to the folded position. Because the actuating forces are applied to the hinge member 14 on opposite sides of the hinge axis 12, the hinge pivot is not subjected to large strains.

Figure 6:
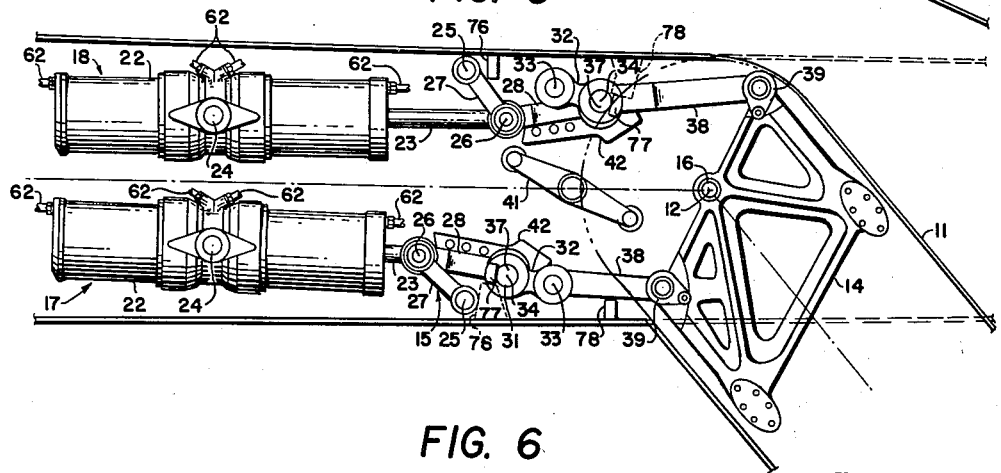
Figure 6 is a view similar to Figures 4 and 5 showing positions the elements assume when the wing tip is in the folded position.
Figure 10:
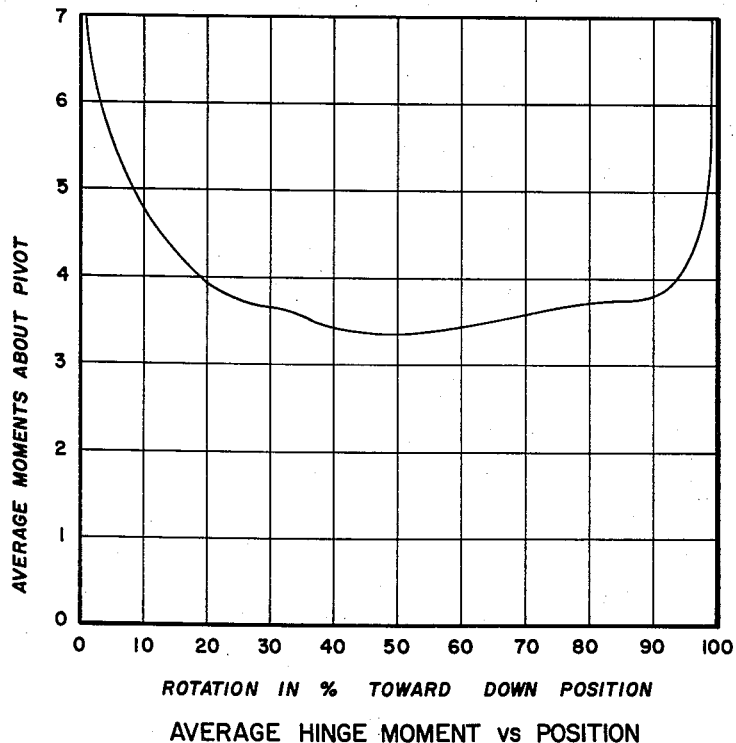
Figure 10 is a plot of the hinge moment curve of the actuation unit.

During the actuation operation, the various elements move from the position of Figure 4 through the intermediate position shown in Figure 5 to the operated position in Figure 6. During the operation, the upper toggle linkage 21 moves to a poistion approaching the extended dead center position and the lower toggle linkage 19 moves to a position approaching a compressed dead center position. The various elements are arranged so that as the upper toggle linkage 21 approaches the extended dead center position, the projection 77 engages the forward stop 78 and as the lower toggle linkage 19 approaches the compressed dead center position, its projection 77 engages the rearward stop 76. Because of the operation of the two toggle linkages 19 and 21, the forces produced by the pressures of the actuators 17 and 18 are capable of maintaining the wing tip 11 in its folded position against substantially any force. In Figure 10, a plot of the hinge moment of the actuating unit is shown. Because of the toggle action, the mechanical advantage of each unit approaches infinity as it approaches the two dead center positions and the mechanism can resist substantially any force which tends to rotate the hinge member 14.

The proportions are arranged to maintain the two toggle linkages 19 and 21 in a position spaced from their dead center position when the wing tip 11 is in the folded position so that the device has a fail-safe characteristic. In the event that hydraulic pressure fails, the wing tips 11 can be returned to their extended position by the aerodynamic forces produced by selected aircraft maneuvers. For this reason, a positive mechanical lock is not provided for the linkage position wherein the wing tip is in the folded position. If it is desired to provide a positive mechanical lock, the proportions can be arranged so that the stops permit movement of the two toggle linkages to their overcenter locked positions when the wing tip 11 is in the folded position.

When the wing tip 11 is to be raised to its extended position, the upper actuator 18 is pressured to produce movement of its piston 23 in a direction to the left and the lower actuator 17 is pressurized to extend its piston 23. This causes the two linkages to move back through the intermediate position of Figure 5 to the position of Figure 4. When the system returns to the extended position of Figure 4, the spring 63 of the lock actuator 43 returns the locking lever 41 to its position wherein it mechanically locks the wing tip 11 in the extended position.

To prevent jamming in the event one of the actuators malfunctions and does not provide the force necessary to move the associated toggle linkage from its overcenter locked position, a torque tube or coupling 81, shown in Figure 3, is connected to the locking crank arms of adjacent units. Therefore, adjacent units will supply the torque necessary to unlock the toggle linkage when such malfunctions occur. This interconnection does not provide the driving force necessary to equalize the load on the toggle linkage. However, once the toggle linkage is unlocked, the wing tip 11 can be operated by the remaining properly functioning units.

The idler crank arms 27 and the drive links 28 provide a mechanism which is capable of producing rotational torque to rotate the locking crank arms 32 through an angle substantially equal to 180° during the operation of the system. Without the use of the idler crank arms 27 and the drive links 28, the actuator would be incapable of providing usable torque through such a large angle.

Those skilled in the art will recognize that an overcenter toggle linkage of the type utilized in this structure is operative as a positive mechanical lock even when an additional lock such as the locking lever 41 is not used. However, in most aircraft installations, the degree of reliability dictates the use of the mechanical latching function provided by the locking lever 41. In installations where this reliability requirement is not as great, the locking lever 41 and its associated actuator could be eliminated without affecting the mode of operation. The actuation system has been described in connection with a foldable wing tip but it should be understood that it could be utilized in any application where a member must be rotated between two positions and securely locked in each of these positions.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. An actuating system comprising first and second members hinged together for relative rotation about a hinge axis between a first and a second position, a linkage including a locking crank pivoted on said first member and a locking link pivoted on said second member, a pivot connecting said locking link and crank, said linkage being in substantially an extended dead center position when said members are in said first position and in substantially a retracted dead center position when said members are in said second position, and fluid operated means connected to said locking crank operable to move said linkage between said extended dead center position and said retracted dead center position.

2. An actuating system comprising first and second members hinged together for relative rotation about a hinge axis between a first and a second position, a linkage including a locking crank pivoted on said first member and a locking link pivoted on said second member, a pivot connecting said locking link and crank, said linkage being in substantially an extended dead center position when said members are in said first position and in substantially a retracted dead center position when said members are in said second position, fluid operated means connected to said locking crank operable to move said linkage between said extended dead center position and said retracted dead center position, fixed stop means engaging one side of said linkage when it is in each dead center position, and a movable lock means on the other side of said linkage maintaining it against said fixed stop means when it is in one of said dead center positions.

3. An actuating system comprising first and second members hinged together for relative rotation about a hinge axis between a first and a second positon, a linkage including a locking crank pivoted on said first member and a locking link pivoted on said second member, a pivot connecting said locking link and crank, said linkage being in substantially an extended dead center position when said members are in said first position and in substantially a retracted dead center position when said members are in said second position, a linear actuator mounted on said first member having an output element movable in response to fluid pressure, an idler crank pivoted on said first member, and a drive link pivoted at one end on said idler crank and output element and on its other end on said locking crank.

4. An actuating system comprising first and second members hinged together for relative rotation about a hinge axis between a first and a second position, a linkage including a locking crank pivoted on said first member and a locking link pivoted on said second member, a pivot connecting said locking link and crank, said linkage being in substantially an extended dead center position when said members are in said first positon and in substantially a retracted dead center position when said members are in said second position, a linear actuator mounted on said first member having an output element movable in response to fluid pressure, an idler crank pivoted on said first member, and a drive link pivoted at one end on said idler crank and output element and on its other end on said locking crank, the axis of the pivot between said drive link and locking crank being spaced from the axis of the pivot between said locking link and locking crank.

5. An actuating system for moving a wing tip relative to the main wing about a hinge axis between an extended and a folded position comprising a linkage including a locking crank pivoted on said main wing and a locking link pivoted on said wing tip, a pivot connecting said locking link and crank, a first fixed stop engaging said linkage when said linkage is in an overcenter position and said wing tip is in said extended position, a second fixed stop engaging said linkage when it approaches one dead center position and said wing tip is in said folded positon, and fluid operated means connected to said locking crank operable to move said wing tip between said extended and folded positions.

6. An actuator system comprising first and second members hinged for relative rotation about a hinge axis, a first linkage connected between said members on one side of said hinge axis, a second linkage connected between said members on the other side of said hinge axis, each linkage including a locking crank pivoted on said first member, a locking link pivoted on said second member and a pivot connecting associated locking cranks and links, said first linkage being substantially in a retracted dead center position and said second linkage being substantially in an extended dead center position when said members are in a first position, said first linkage being substantially in an extended dead center position and said second linkage being substantially in a retracted dead center position when said members are in a second position, and actuator means mounted on said first member connected to said first and second linkages operable to move said second member between its first and second positions.

7. An actuator system comprising first and second members hinged for relative rotation about a hinge axis, a first linkage connected between said members on one side of said hinge axis, a second linkage connected between said members on the other side of said hinge axis, each linkage including a locking crank pivoted on said first member, a locking link pivoted on said second member and a pivot connecting associated locking cranks and links, said locking links being pivoted on said second member at points equally spaced from said hinge axis, said first linkage being substantially in a retracted dead center position and said second linkage being substantially in an extended dead center position when said members are in a first position, said first linkage being substantially in an extended dead center position and said second linkage being substantially in a retracted dead center position when said members are in a second position, and actuator means mounted on said first member connected to said first and second linkages operable to move said second member between its first and second positions.

8. An actuator system comprising first and second members hinged for relative rotation about a hinge axis, a first linkage connected between said members on one side of said hinge axis, a second linkage connected between said members on the other side of said hinge axis, each linkage including a locking crank pivoted on said first member, a locking link pivoted on said second member and a pivot connecting associated locking cranks and links, said first linkage being substantially in a retracted dead center position and said second linkage being substantially in an extended dead center position when said members are in a first position, said first linkage being substantially in an extended dead center position and said second linkage being substantially in a retracted dead center position when said members are in a second position, first and second linear actuators each mounted on said first member and each including an output element movable in response to fluid pressure, and connecting means between the output elements of said first and second actuators and said first and second linkages respectively operable to move said linkages between said substantially dead center positions.

9. An actuator system comprising first and second members hinged for relative rotation about a hinge axis, a first linkage connected between said members on one side of said hinge axis, a second linkage connected between said members on the other side of said hinge axis, each linkage including a locking crank pivoted on said first member, a locking link pivoted on said second member and a pivot connecting associated locking cranks and links, said first linkage being substantially in a retracted dead center position and said second linkage being substantially in an extended dead center position when said members are in a first position, said first linkage being substantially in an extended dead center position and said second linkage being substantially in a retracted dead center position when said members are in a second position, first and second linear actuators each pivoted on said first member and each including an output element movable in response to fluid pressure, a first connection between the output element of said first actuator and the locking crank of said first linkage, and a second connection between the output element of said second actuator and the locking crank of said second linkage, each connection including an idler crank pivoted on said first member and a drive link pivoted at one end on its associated output element and idler crank and on its other end on the associated locking crank.

10. An actuator system comprising first and second members hinged for rotation about a hinge axis and a plurality of actuating units spaced along said hinge axis; each unit including a linkage connected between said members, said toggle including a locking crank pivoted on said first member, a locking link pivoted on said second member and a pivot connecting associated locking cranks and links, said linkage being substantially in a retracted dead center position when said members are in a first position and being substantially in an extended dead center position when said members are in a second position, a linear actuator pivoted on said first member including an output element movable in response to fluid pressure, a connection between the output element of said actuator and said locking crank of said linkage including an idler crank pivoted on said first member, and a drive link pivoted at one end on said output element and drive crank and on its other end on said locking crank; and a coupling between the locking cranks of adjacent units preventing relative rotation therebetween.

11. An actuator system comprising first and second members hinged for rotation about a hinge axis and a plurality of actuating units; each unit including a first linkage connected between said members on one side of said hinge axis, a second linkage connected between said members on the other side of said hinge axis, each linkage including a locking crank pivoted on said first member, a locking link pivoted on said second member and a pivot connecting associated locking cranks and links, said first linkage being substantially in a retracted dead center position and said second linkage being substantially in an extended dead center position when said members are in a first position, said first linkage being substantially in an extended dead center position and said second linkage being substantially in a retracted dead center position when said members are in a second position, first and second linear actuators each pivoted on said first member and each including an output element movable in response to fluid pressure, a first connection between the output element of said first actuator and the locking crank of said first linkage, and a second connection between the output element of said second actuator and the locking crank of said second linkage, each connection including an idler crank pivoted on said first member, and a drive link pivoted at one end on its associated output element and idler crank and on its other end on the associated locking crank, and a coupling between the locking cranks of adjacent units preventing relative rotation therebetween.

References Cited in the file of this patent

UNITED STATES PATENTS

| 369,994 | Player | Sept. 13, 1887 |
| 2,790,541 | Friedman | Apr. 30, 1957 |
| 2,864,239 | Taylor | Dec. 16, 1958 |